(12) United States Patent
Duke et al.

(10) Patent No.: US 9,409,129 B2
(45) Date of Patent: Aug. 9, 2016

(54) HEAT EXCHANGE SYSTEM

(75) Inventors: Mikel Colin Duke, Newport (AU); Angela Hausmann, Voerde (DE)

(73) Assignee: VICTORIA UNIVERSITY, Melbourne, Victoria (AU)

( * ) Notice: Subject to any disclaimer, the term of this patent is extended or adjusted under 35 U.S.C. 154(b) by 430 days.

(21) Appl. No.: 14/002,452

(22) PCT Filed: Mar. 2, 2012

(86) PCT No.: PCT/AU2012/000215
§ 371 (c)(1),
(2), (4) Date: Nov. 19, 2013

(87) PCT Pub. No.: WO2012/116409
PCT Pub. Date: Sep. 7, 2012

(65) Prior Publication Data
US 2015/0090647 A1    Apr. 2, 2015

(30) Foreign Application Priority Data
Mar. 3, 2011    (AU) ................. 2011900759

(51) Int. Cl.
*B01D 3/00* (2006.01)
*B01D 61/36* (2006.01)
*F28D 21/00* (2006.01)
(Continued)

(52) U.S. Cl.
CPC ............ *B01D 61/364* (2013.01); *B01D 61/368* (2013.01); *C02F 1/02* (2013.01); *C02F 1/447* (2013.01); *F28D 21/0015* (2013.01);
(Continued)

(58) Field of Classification Search
USPC .............. 202/233, 185.2, 239, 270; 210/151, 210/175, 180, 321.72, 321.77
See application file for complete search history.

(56) References Cited

U.S. PATENT DOCUMENTS 3,406,096 A    10/1968 Rodgers
4,476,024 A    10/1984 Cheng
(Continued)

FOREIGN PATENT DOCUMENTS

JP    60-187305 A    9/1985
JP    60-197205 A    10/1985
(Continued)

OTHER PUBLICATIONS

Kullab, A. et al. (2011). "Membrane Distillation and Applications for Water Purification in Thermal Cogeneration Plants," *Separation and Purification Technology* 76:231-237.
(Continued)

*Primary Examiner* — Nina Bhat
(74) *Attorney, Agent, or Firm* — Morrison & Foerster LLP

(57) ABSTRACT

A heat exchanger including a hot process stream fluidly connected to an industrial process, a cold process stream fluidly connected to an industrial process, and a membrane distillation system. The membrane distillation system includes a vaporizing stream comprising a mixture of components, a condensing stream, and a membrane located between the vaporizing stream and the condensing stream. The vaporizing stream and condensing stream are in fluid communication through the membrane. The membrane distillation system also includes a first heat transfer area between the hot process stream and the vaporizing stream. Additionally, the membrane distillation system includes a second heat transfer area between the condensing stream and the cold process stream.

16 Claims, 4 Drawing Sheets

(51) Int. Cl.
*C02F 1/44* (2006.01)
*C02F 1/02* (2006.01)
(52) U.S. Cl.
CPC ....... *B01D2311/103* (2013.01); *B01D 2313/38* (2013.01); *Y02W 10/37* (2015.05)

(56) References Cited

U.S. PATENT DOCUMENTS

| | | | | |
|---|---|---|---|---|
| 5,770,020 | A * | 6/1998 | Koistinen | B01D 1/22 159/13.3 |
| 6,635,150 | B1 * | 10/2003 | Le Goff | B01D 1/221 159/13.1 |
| 6,716,355 | B1 | 4/2004 | Hanemaaijer et al. | |
| 8,034,217 | B2 * | 10/2011 | Ito | B01D 1/221 159/27.3 |
| 8,287,735 | B2 * | 10/2012 | Hanemaaijer | B01D 1/0035 202/176 |
| 2003/0164232 | A1 * | 9/2003 | Inoue | F28F 9/02 165/148 |
| 2004/0211726 | A1 * | 10/2004 | Baig | B01D 53/22 210/640 |
| 2006/0010887 | A1 * | 1/2006 | Lee | B01D 5/0015 62/93 |
| 2009/0000939 | A1 | 1/2009 | Heinzl | |
| 2010/0072135 | A1 | 3/2010 | Hanemaaijer et al. | |
| 2010/0300946 | A1 | 12/2010 | Nguyen et al. | |
| 2011/0132826 | A1 * | 6/2011 | Muller | B01D 31/364 210/176 |
| 2011/0180383 | A1 * | 7/2011 | Ma | B01D 61/364 203/22 |
| 2013/0206658 | A1 * | 8/2013 | Wu | B01D 3/007 210/153 |

FOREIGN PATENT DOCUMENTS

| | | |
|---|---|---|
| JP | 62-033506 A | 2/1987 |
| JP | 62-057611 A | 3/1987 |
| JP | 09-024249 A | 1/1997 |
| WO | WO-2005/089914 A1 | 9/2005 |
| WO | WO-2008/085104 A1 | 7/2008 |
| WO | WO-2008/099325 A2 | 8/2008 |
| WO | WO-2008/099325 A3 | 8/2008 |
| WO | WO-2009/073921 A1 | 6/2009 |
| WO | WO-2010/019751 A1 | 2/2010 |
| WO | WO-2010/021545 A1 | 2/2010 |
| WO | WO-2010/071605 A1 | 6/2010 |
| WO | WO-2010/127818 A1 | 11/2010 |

OTHER PUBLICATIONS

Extended European Search Report mailed on Jan. 9, 2015, for EP Patent Application No. 12752470.0, filed on Mar. 2, 2012, 6 pages.

* cited by examiner

HEAT EXCHANGE SYSTEM

CROSS-REFERENCE TO RELATED APPLICATIONS

This application is a National Phase application under 35 U.S.C. §371 of International Application No. PCT/AU2012/000215 filed Mar. 2, 2012 and claims the benefit of Australian Application No. 2011900759 filed Mar. 3, 2011, the disclosures of which are incorporated herein by reference in their entirety.

FIELD OF THE INVENTION

The present invention generally relates to a heat exchange system, and more particularly a membrane distillation heat exchanger system and apparatus. The invention is particularly applicable for use in water treatment applications and it will be convenient to hereinafter disclose the invention in relation to that exemplary application. However, it is to be appreciated that the invention is not limited to that application and could be used in any process system, process train or plant that include both heat exchange and fluid treatment process steps.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Heat exchange technology is a ubiquitous part of many chemical and industrial processes. Process streams generally need heat adjustment to meet requirements for a unit process, transport, discharge or the like. Utilisation of the different temperatures of process streams within industrial processes using, for example pinch analysis methodology, can assist in minimising energy consumption of chemical processes. In many cases, excess heat from one or more process streams can be transferred to a cooler process stream through a heat exchanger.

Purified process water and/or other liquids can also be required in a large number of chemical and industrial processes. Purified water can be produced using a number of unit operations, such as distillation, osmosis, membrane filtration or the like. All these processes require a significant amount of energy to operate.

One process that can be used to produce purified process water is membrane distillation. Membrane distillation is a separation method in which a porous membrane is used to separate a vapour phase from a hot vapourising liquid feed (or retentant) on one side of the membrane and feed that vapour to a cold condensing, permeate fluid, or in some cases a cold surface, on the other side. A vapour pressure temperature difference is established across the membranes sides to create a vapour pressure difference between the membrane sides which is the driving force for the diffusion. Temperature difference across the membrane can conveniently create the vapour pressure difference, but vapour can also be drawn away from the membrane by other means. Separation is achieved utilising the relative volatility of various components in the vapourising fluid enabling vapour from components in the vapourising fluid of higher volatility to passes through the membrane pores by a convective or diffusive mechanism. In the case of membranes with smaller pores, the membrane can also act selectively by molecular sieving and/or adsorption based separation. This is more commonly referred to as pervaporation. In any case, the vapour penetrates through the porous membrane, and condenses in the cooler fluid or surface on the condensing permeate side or in an externally mounted condenser unit. The condensed vapour is therefore removed from the retentant and thus is beneficial in its effect to separate the vapour from the retentant. An example of such benefit is the desalination of salty water.

There are four broad types of membrane distillation systems:
1. Direct contact membrane distillation (DCMD), where both the warm, vaporising vapourising stream and the cold condensing stream (distillate stream) are in direct contact with the membrane.
2. Air gap membrane distillation (AGMD), where a condenser surface contacting the condensing stream is separated from the membrane by an air gap.
3. Sweeping gas membrane distillation (SGMD), where the vaporised portion of the vapourising stream is removed in vapour form by an inert gas.
4. Vacuum membrane distillation (VMD), where the vaporised portion of the vapourising stream is removed in vapour form by vacuum.

Each of these membrane distillation systems require an external heat source and sink to heat the vapourising fluid and cool the condensing fluid. The vapourising fluid is typically heated using waste or fuel derived (combustion) sources. The condensing fluid is typically cooled using a cooling vent, such as a convective air cooler.

Energy optimisation of membrane distillation systems have generally concentrated on the use of cheap or waste heat sources, for example solar and waste process heat, to heat and vapourise the liquid feed of these systems.

For example, Japanese patent publication JP62057611A describes an air gap membrane distillation system for desalinating seawater using diesel engine waste heat from a cooling fluid of that engine. This desalination system comprises two non-permeable condensing heat-transfer plates provided on the outside of two permeable membranes, forming a liquid condensate passage therebetween, and two non-permeable heating heat-transfer plates located between both permeable membranes, forming a heat source fluid passage therebetween. Furthermore, a raw liquid passage is formed between the heating heat-transfer plate and the permeable membrane. Cooling fluid from a diesel engine is passed through the heat source fluid passage as the heat source fluid. Seawater is fed into a cooling liquid passage to cool the heat-transfer plate and the resulting heated seawater is sent into the raw liquid passage for distillation through the membrane distillation system. Energy efficiency in this system is obtained by capturing lost heat from the membrane distillation process in the incoming seawater prior to being fed into to the membrane distillation membrane.

United States patent publication US2010/0072135A1 describes a membrane distillation in which a distillate is created by passing the heat of condensation (latent heat) towards a condenser surface which is contact with the feed stream of the membrane distillation system, enabling at least part of the latent heat to be transferred to that feed stream. Energy efficiency in this system is again obtained by capturing lost heat from the membrane distillation process in the incoming feed stream prior to being fed into to the membrane distillation membrane.

Furthermore, the paper "Membrane distillation and applications for water purification in thermal cogeneration plants" by Alaa Kullab and Andrew Martin, Separation and Purification Technology 76 (2011) 231-237 ("Kullab and Martin"), describes a cogeneration type membrane distillation (MD) process which uses waste heat produced from a first industry process (district heating supply) to supply heat to an unrelated industrial process (municipal water, used as cooling water for the MD process). The test unit produces 1 to 2 m³/day of purified water. In this case, the MD unit is being utilised in a cogeneration configuration, where waste heat from a first industrial process is useful elsewhere in another industrial process. Internal process energy efficiency is therefore not achieved in each individual industrial process.

None of these prior membrane systems assist in heat optimisation of process streams within a proximate and related chemical process in that plant, and more particularly utilise internal heat recycling for an industrial process or plant. Energy optimisation of the systems focuses on energy efficiency of the membrane distillation process in isolation to the overall chemical process in which that membrane distillation system is a part of.

It would therefore be desirable to provide a membrane distillation system which can provide a more energy efficient means of heating and cooling the process streams of a co-located chemical or industrial process in an industrial plant, and more particularly heating and cooling the process streams utilising internal heat recycling for a plant.

SUMMARY OF THE INVENTION

A first aspect of the present invention provides a heat exchanger including a hot process stream fluidly connected to an industrial process, a cold process stream fluidly connected to an industrial process, and a membrane distillation system. The membrane distillation system includes a vapourising stream comprising a mixture of components, a condensing stream, and a membrane located between the vapourising stream and the condensing stream. The vapourising stream and condensing stream are in fluid communication through the membrane. The membrane facilitates transfer of at least one volatised component of the vapourising stream into the condensing stream. The membrane distillation system also includes a first heat transfer area between the hot process stream and the vapourising stream. In use, the first heat transfer area facilitates the transfer of a quantity of heat energy from the hot process stream to the vapourising stream to heat the vapourising stream. Additionally, the membrane distillation system includes a second heat transfer area between the condensing stream and the cold process stream. In use, the second heat transfer area facilitates transfer of a quantity of heat energy from the condensing stream to the cold process stream.

A second aspect of the present invention provides a membrane distillation apparatus that includes a vapourising stream comprising a mixture of components, a condensing stream, and a membrane located between the vapourising stream and the condensing stream. The vapourising stream and condensing stream are in fluid communication through the membrane. The membrane facilitates transfer of at least one volatised component of the vapourising stream into the condensing stream. The system also includes a hot process stream. A first heat transfer area is also provided between the hot process stream and the vapourising stream. In use, the first heat transfer area facilitates transfer of a quantity of heat energy from the hot process stream to the vapourising stream to heat the vapourising stream. The system also includes a cold process stream. The hot and cold process streams can be part of or fluidly linked to a co-located or generally proximate industrial process, and in some cases part of the same co-located or generally proximate industrial process. More preferably, the hot and cold process streams are internal process streams of an industrial process or plant which are utilised for internal heat recycling for in that process or plant. A second heat transfer area is provided between the condensing stream and the cold process stream. In use, the second heat transfer area facilitates transfer of a quantity of heat energy from the condensing stream to the cold process stream to produce a heated cold process stream. Furthermore, the hot process stream and cold process stream are fluidly separate to the vapourising stream and the condensing stream.

The present invention results from the realisation that membrane distillation processes can be coupled with heat exchange functionality to provide a duel energy saving benefit for a chemical/industrial process. The system and apparatus of the present invention form a heat exchanger which transfers energy from the hot process stream to the cold process stream of a co-located or generally proximate industrial process, and more preferably heating and cooling the hot and cold process streams utilising internal heat recycling for a plant. The system and apparatus also utilizes energy in hot process streams of a co-located or generally proximate industrial process to heat the vapourising fluid of a membrane distillation apparatus. The energy transferred between these streams can be significant compared to heat exhausted from the process (waste heat), which can become a substantial energy source for membrane distillation.

In a preferred embodiment, the system and apparatus utilizes energy in hot process streams of a single industrial plant or process to heat the vapourising fluid of a membrane distillation apparatus, preferably hot and cold process streams utilising internal heat recycling for a plant. In this respect, the process of the present application can be utilised in industrial plants and process in which cogeneration is not possible. The present invention can be installed between any process streams of different heat value, where it is apparent this heat is of value within the process as opposed to simply needing to get rid of it to a sink of little concern to the operation of the plant or process. The applicability of the present invention spans to many more industries than just simply 'thermal' plants, such as is for example is covered by the MD arrangement discussed in Kullab and Martin.

This is a different view to conventional energy efficiency considerations for membrane distillation which focuses on membrane distillation sourcing heat from waste sources or from combusted fuels reduce and in some forms substantially avoid the use of additional heat in the plant's overall operations and thus can reduce the overall energy burden in that process and plant.

The present invention also increases the benefit of internal fluid treatment within an industrial process. Process streams within a co-located or generally proximate industrial process can be treated using membrane distillation to improve their value in applications such as water reuse or product refinement.

It should be understood that hot process stream refers to a process stream that has a temperature differential relative to the vapourising stream and the condensing stream, where the hot process stream is at a higher temperature than the vapourising stream and the condensing stream. Similarly, the cold process stream refers to a process stream that has a temperature differential relative to the vapourising stream and the condensing stream, where the cold process stream is at a lower temperature than the vapourising stream and the condensing stream. In those embodiments that have a hot stream and a cold stream, it should be understood that the hot stream is at a higher temperature than the cold stream. The exact temperatures and temperature differential is dependent on the vaporisation temperature desirable for the vapourising stream and the condensation temperature of the condensing stream. It should be appreciated that a large number of temperature differentials are therefore possible within the scope of the present invention.

The system and apparatus of the present invention acts as a heat exchanger and heat a cold process stream using energy from the hot process stream. The membrane distillation apparatus harnesses work as it internally transfers energy from the hot process stream (heat source) to the cold process stream (heat sink). In use, a quantity of heat energy can be transferred from the hot process stream to the cold process stream to heat the cold process stream. This quantity of heat energy is preferably transferred through the first heat transfer area, through the membrane and through the second heat transfer area. It should be appreciated that the membrane transfers latent and sensible heat from the vapourising stream to the condensing stream.

This form of the membrane distillation system can be conceptually viewed as a heat exchanger which includes a membrane distillation apparatus in which the vapourising stream, the condensing stream and the membrane are located. The hot process stream and cold process stream form the two process flows flowing into the heat exchanger across which latent and sensible heat is transferred.

The present invention can incorporate any conventional Membrane Distillation apparatus or system including (but not limited to) Direct Contact Membrane Distillation (DCMD), Air Gap Membrane Distillation (AGMD), Sweep Gas Membrane Distillation (SGMD) or Vacuum Membrane Distillation (VMD). These systems all require a heat source and sink.

The membrane in the system and apparatus of the present invention acts as a physical barrier between the vapourising and condensing streams which only allows the transport of vapour from the heat vapourising stream to the cooled condensing stream. The membrane is preferably substantially hydrophobic, and more preferably nonwetting and microporous. Suitable membranes include ethylene chlorotrifluoroethylene (Halar), polytetrafluoroethylene (PTFE), polypropylene (PP), polyethylene (PE), or poly(vinylidene fluoride) (PVDF) based membranes. The membranes can have any suitable configuration including hollow fibre membranes, sheet, tubular, plate, mat types or the like. The system also extends to inorganic (including ceramic) membranes, as well as those inorganic and polymeric membranes with a selective ability (i.e. pervaporation membranes).

The heat exchanger system and membrane distillation apparatus may also include a heat recovery system which facilitates transfer of a quantity of heat energy from the heated cold process stream to the vapourising stream. In some embodiments, the heat recovery system is a preheater which precedes the first heat transfer area.

The first heat transfer area and/or second heat transfer area may comprise a heat exchanger. Various heat exchangers are possible, including but not limited to a shell and tube heat exchanger, plate heat exchanger, adiabatic heat exchanger, plate heat exchanger, fin heat exchanger, pillow plate heat exchanger, fluid heat exchangers, waste heat recovery units, dynamic scraped surface heat exchanger, phase-change heat exchangers, direct contact heat exchangers, HVAC air coils, or spiral heat exchangers. In preferred forms, at least one or each of the first heat transfer area or second heat transfer area comprises a plate heat exchanger.

The first and second heat transfer areas may be housed in a separate process vessel or apparatus to a process vessel that includes the membrane. For example, the first and second heat transfer areas may be housed in a separate heat exchanger. In other embodiments, the first and second heat transfer area may be housed in the same process vessel or apparatus which includes the membrane. Preferably, the first heat transfer area is located generally proximate the membrane. Similarly, the second heat transfer area is preferably located generally proximate the membrane. Typically each of the first and second heat transfer areas would be co-located with the membrane in a process vessel. In these embodiments, heat is transferred between the hot process stream and the vapourising stream and/or between the condensing stream and the cold process stream substantially simultaneously when the vapourising stream and condensing stream contacts the membrane.

The heat exchanger system and membrane distillation apparatus of the present invention preferably utilises waste heat sources in a co-located or generally proximate process (as opposed to valuable sources) to heat the vapourising stream to drive separation of the components in the vapourising stream. For example, in one embodiment the hot process stream and/or cold process stream are process streams of a dairy processing plant. For example, the hot process stream may be a whey process stream. Furthermore, the vapourising stream may be a water stream, a waste water stream which is treated, and in some cases substantially purified, when the vaporised water component of that waste water stream passes through the membrane. In some embodiments, the vapourising stream may be a water or liquid stream which undergoes concentration through the vaporization of a component.

The hot process stream and cold process stream are preferably process streams which are respectively cooled and heated in the co-located or generally proximate process. The desired temperature of each of these streams would typically be utilised in a heat exchanger to obtain the desired temperature. The membrane system of the present invention could be used in this heat exchanger to provide additional fluid treatment benefits to process fluids, for example process water, in that process. Preferably, the hot process stream and cold process streams of the heat exchanger system are fluidly separate to the vapourising stream and the condensing stream.

The membrane distillation apparatus of the present invention is preferably constructed as a module.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
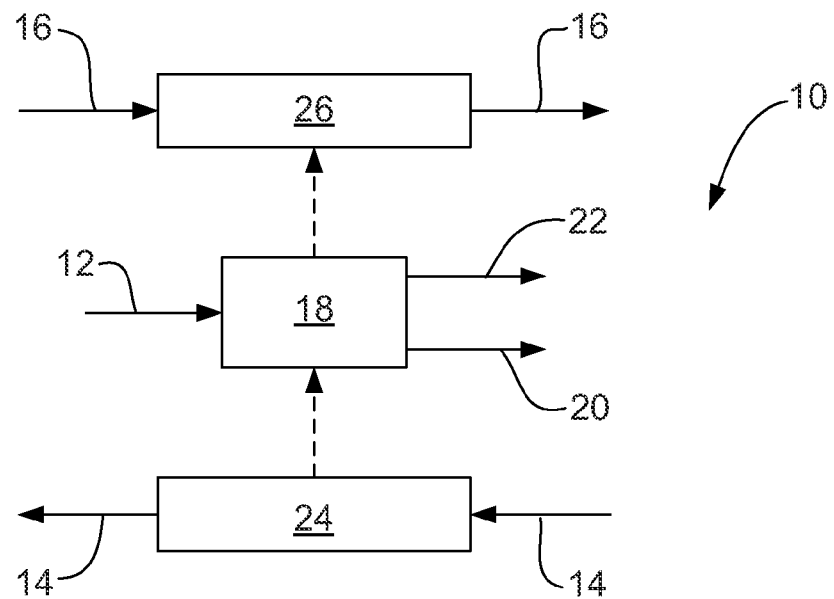
FIG. 1 is a broad schematic representation of a heat exchanger system according to one embodiment of the present invention.
Figure 3:
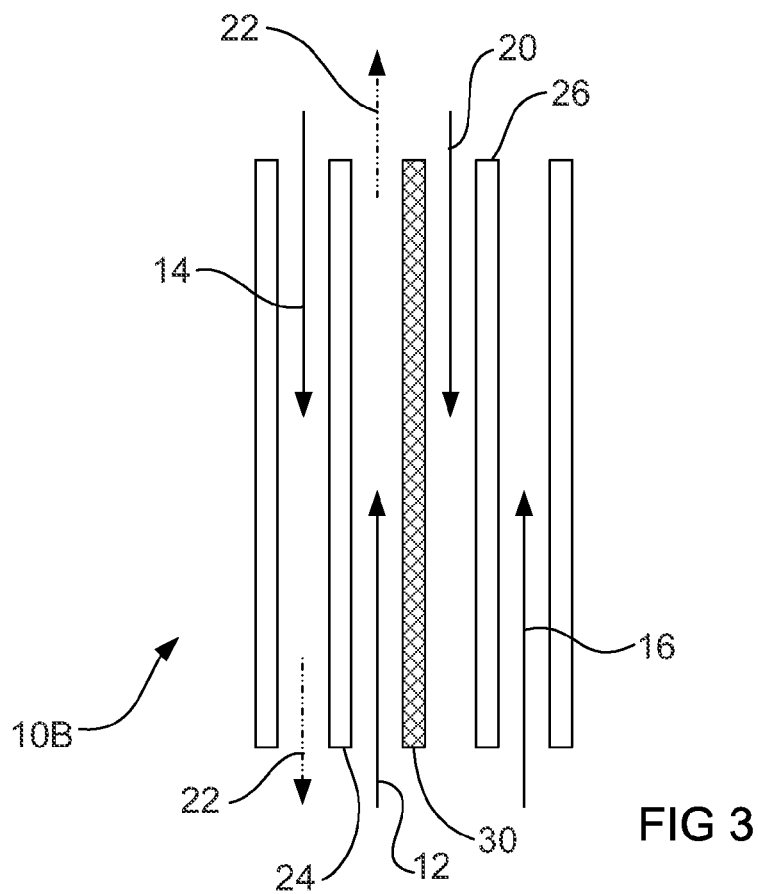
FIG. 3 shows the general configuration of a modified Direct Contact Membrane Distillation system including a direct heat exchange system according to one embodiment of the present invention.
Figure 2:
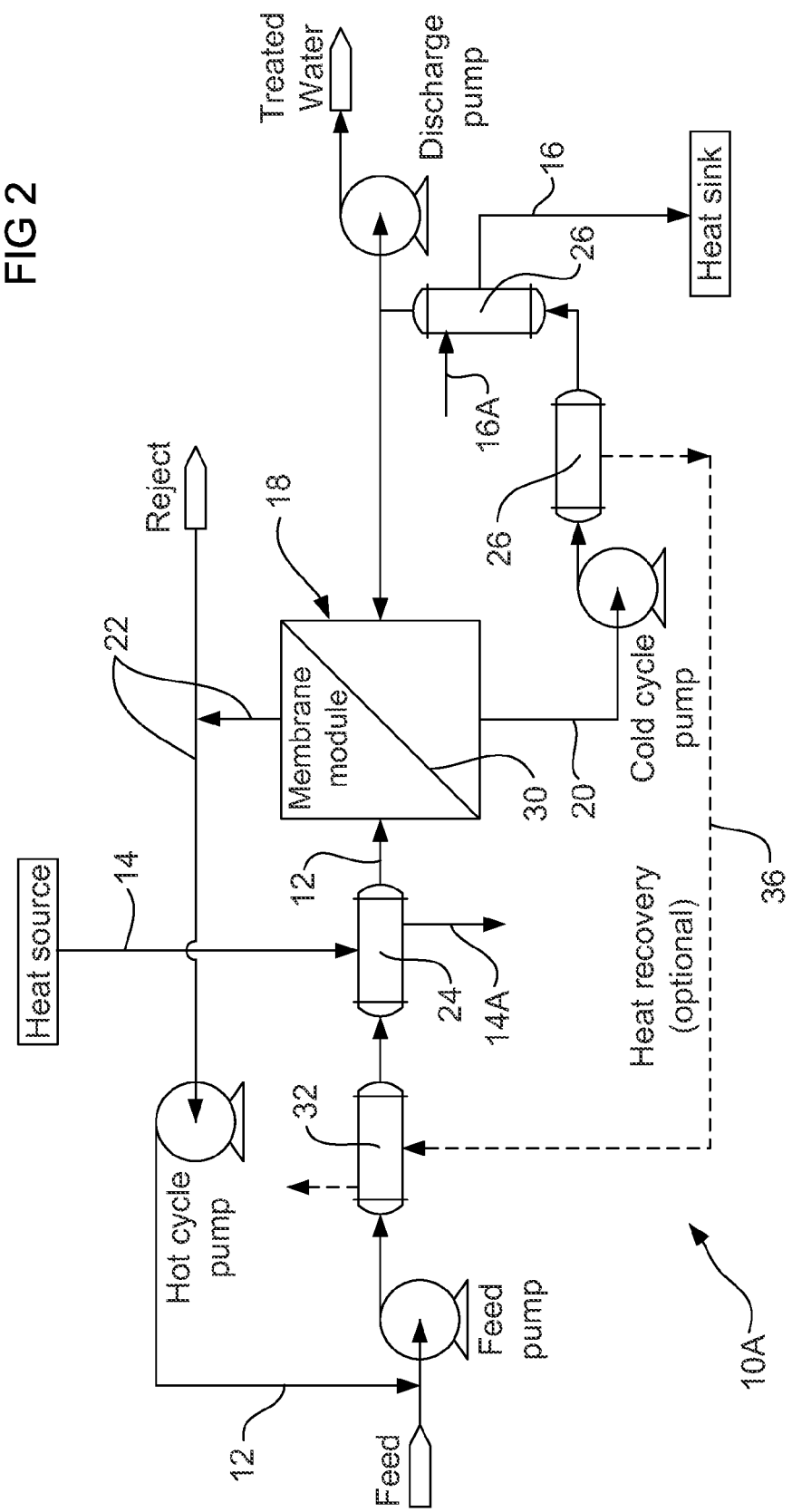
FIG. 2 is a process flow diagram illustrating a heat exchanger system according to one embodiment of the present invention which includes a Direct Contact Membrane Distillation system.

FIGS. 1 to 3 illustrate a new process system 10, hereinafter referred to as a membrane distillation heat exchanger (MDHX) that operates as a heat exchanger in the process industry, and utilizes the exchange of heat to treat a separate process stream (vapourising stream 12 in FIGS. 1 to 3) to improve the value of that stream for other uses. For example, that stream 12 could be a process water stream which is purified for reuse or product development or could be a process stream which is purified or concentrated for reuse or product development.

As best shown in FIG. 1, the membrane distillation heat exchanger 10 includes a hot process stream 14 fluidly connected to an industrial process (not shown), a cold process stream 16 fluidly connected to an industrial process (not shown), preferably the same industrial process as the hot process stream 14, and a membrane distillation system 18. The membrane distillation system 18 includes a vapourising stream 12, in this case used process water, a condensing stream 20 that comprises purified water, a reject stream 22 that comprises concentrated contaminated water, and a membrane (not shown in FIG. 1, but component 30 in FIGS. 2 and 3) located between the vapourising stream 12, reject stream 22 and the condensing stream 20. The hot process stream 14 and cold process stream 16 are fluidly separate to the vapourising stream 12 and the condensing stream 20.

The vapourising stream 12, and reject stream 22 are located on one side of the membrane 30 and the condensing stream 20 is on the other side of the membrane. The vapourising stream 12 and condensing stream 20 are in fluid communication through the membrane 30. The membrane 30 facilitates transfer of volatised water of the vapourising stream 12 into the condensing stream 20, thereby purifying that water. The remaining water in the vapourising stream 12 which is not evaporated in the membrane distillation system 18 and transported through the membrane 30 exits the membrane distillation system 18 via the reject stream 22 a concentrated contaminated water product.

It should be appreciated that the membrane distillation heat exchanger 10 can also concentrating a vapourising stream 12, for example a product stream such as producing a protein-concentrate of high value. In this embodiment, the reject stream 22 would comprise the concentrated high value product.

The membrane distillation heat exchanger 10 also includes a first heat transfer area 24 between the hot process stream 14 and the vapourising stream 12. In use, the first heat transfer area 24 facilitates the transfer of a quantity of heat energy from the hot process stream 14 to the vapourising stream 12 to heat the vapourising stream 12 to a temperature in which the partial pressure of volatised water is sufficient in the vapourising stream 12 to pass through the membrane. The membrane distillation heat exchanger 10 also includes a second heat transfer area 26 between the condensing stream 20 and the cold process stream 16. In use, the second heat transfer area 26 facilitates transfer of a quantity of heat energy from the condensing stream 20 to the cold process stream 16. This cools the condensing stream 20, which is heated through latent and sensible heat transfer from the vapourising stream 12 through the membrane 30, and also heats the cold process stream 16.

The hot process stream 14 and cold process stream 16 preferably comprise process streams which are respectively cooled and heated in the co-located or generally proximate industrial process. In alternative embodiments (not illustrated), the cold process stream 16 could be replaced with a coolant stream or other heat sink without departing from the scope of the present invention. Nevertheless, it should be appreciated that optimal energy utilisation for an industrial process would be gained by using a cold process stream 16 from that industrial process.

The membrane 30 used in the membrane distillation system 18 is a nonwetting and microporous membrane. One or more membranes can be used to perform the separation function described above. Suitable membranes 30 include ethylene chlorotrifluoroethylene (Halar), polytetrafluoroethylene (PTFE), polypropylene (PP), polyethylene (PE), or poly(vinylidene fluoride) (PVDF) based membranes. The membrane or membranes 30 can have any suitable configuration including hollow fibre membranes, sheet, tubular, plate, mat types or the like.

The first heat transfer area 24 and second heat transfer area 26 are configured to transfer heat between the respective process streams 12, 14, 16, 20. In some embodiments, for example as shown in FIG. 2, each of the first heat transfer area 24 and second heat transfer area 26 is a heat exchanger. Various heat exchangers are possible such as shell and tube heat exchangers, plate heat exchangers or the like.

FIG. 2 shows one form of the membrane distillation heat exchanger 10A according to the present invention which includes a separate membrane distillation apparatus module 18 in which the vapourising stream 12, the condensing stream 20, reject stream 22 and the membrane 30 are housed. The hot process stream 14 (inlet), 14A (exit) and cold process stream 16 (exit), 16A (inlet) are linked to the vapourising stream 12 and condensing streams 20 of that module 18 through individual heat exchangers 24, 26. A feed stream 12A, such as water to be purified or the like, is feed into the system, and a treated water stream 20A is discharged.

This membrane distillation system 10A also includes a heat recovery system in the form of a preheater 32 (shown split into two components either side of the membrane module) which facilitates transfer of quantity of heat energy from the heated cold process stream 20 to the vapourising stream 12 via the heat path 36.

The heat exchanger 26 includes a heat sink which typically comprises the cool process stream which flows through the heat exchanger 26 (via inlet stream 16A and exits as a heated stream 16) but can in some embodiments include an additional heat sink source.

The membrane module 18 for the MDHX system 10A shown in FIG. 2 can be any of the conventional membrane distillation modules currently available on the market. The present invention can incorporate any conventional membrane distillation apparatus or system including (but not limited to) Direct Contact Membrane Distillation (DCMD), Air Gap Membrane Distillation (AGMD), Sweep Gas Membrane Distillation (SGMD) or Vacuum Membrane Distillation (VMD).

FIG. 3 shows a further embodiment of the membrane distillation system 10B according to the present invention in which the design of conventional membrane distillation system has been modified to increase the heat transfer efficiency of the membrane distillation heat exchanger 10B. Here, the first and second heat transfer areas 24 and 26 are proximate and parallel to the membrane 30 co-locating each of these heat transfer areas 24, 26 with the membrane in the module. Heat is transferred between the hot process stream 14 and the vapourising stream 12 and between the condensing stream 20 and the cold process stream 16 when the vapourising stream 12 and condensing stream 20 contacts the membrane 30. It should be appreciated that the various process streams may flow in counter current, co current or cross flow configuration to achieve this heat transfer.

While not wishing to be limited to any one theory, the Applicant considers that the performance of a membrane distillation process substantially depends on the distribution of heat over the surface area of the entire membrane. In the conventional membrane distillation module designs, heat is added to the vapourising stream prior to entering the module. The Membrane Distillation Effect (evaporation on the hot side, condensation on the cold side and sensible heat conduction) inside the module thus has declining temperature profile over the length of the membrane and a reduced efficiency. This is because the hot cycle temperature drops while passing along the membrane, likewise the cold side temperature increases. The result is a reduction in the driving force across the membrane. As shown in the membrane distillation system 10B illustrated in FIG. 3, adding the heat directly to the vapourising stream 12 within the module 10B adjacent the membrane 30, and likewise removing heat from the condensing stream 20 within the module 10B adjacent the membrane 30 can reduce this problem in a way that temperature decline along the membrane in the vapourising stream 12 and condensing stream 20 is reduced or substantially eliminated, thereby increasing the membrane's total area driving force.

The membrane distillation system 10B in FIG. 3 includes a DCMD configuration. It is to be understood that this modification would equally apply in AGMD configurations and may be incorporated into SGMD and VMD configurations. It should be appreciated that SGMD and VMD designs would need to accommodate a condensing unit needed for these systems.

EXAMPLES

Example 1

Dairy Process Integration

In a dairy process, whey is routinely cooled from 45° C. to around 30° C. by a heat exchanger coupled to the incoming milk stream which heats this stream up from 6° C. to about 27° C. In this example, the heat transferred is about 2300 kW.

The heat transferred in this operation can be passed through a MDHX system according to the present invention. Assuming an energy demand of Membrane Distillation (MD) of 100 kWh per m$^3$ of water recovered, the dairy example transferring 2300 kW of heat translates to a water recovery capacity by a MDHX system according to the present invention of 23 m$^3$/hour. In the same plant, this treatment capacity is enough to treat all the water required for cleaning in place procedures. Alternatively, this energy could also be used for concentration purposes instead of or additionally to water recovery.

Example 2

Bench Scale Results

Figure 4:
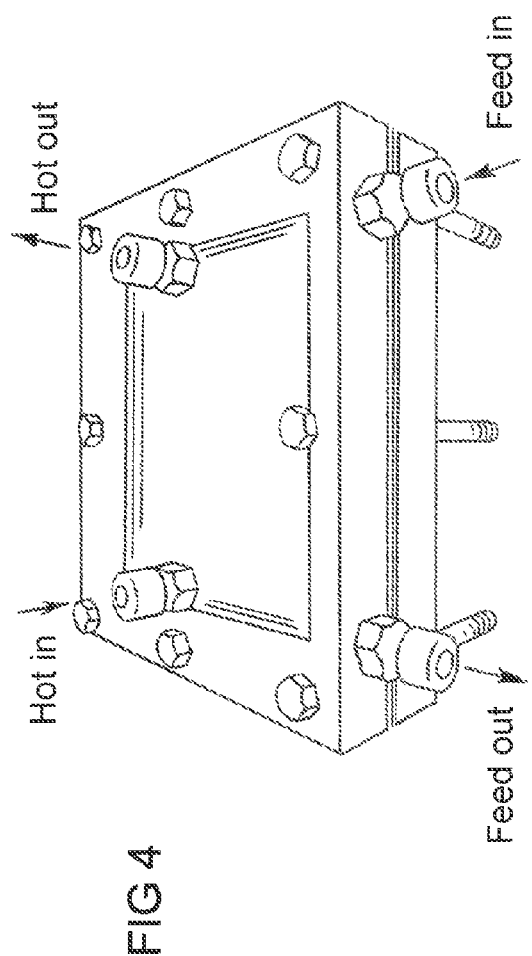
FIG. 4 shows a prototype membrane distillation heat exchanger (MDHX) constructed in accordance with one embodiment of the present invention.

A MDHX module prototype was constructed, and is illustrated in FIG. 4. The hot heat exchange (HE) ports (Hot$_{in}$ and Hot$_{out}$) and feed membrane distillation (MD) ports (Feed$_{in}$ and Feed$_{out}$) are indicated in FIG. 4. It should be appreciated that the cold heat exchange and membrane distillation permeate ports are located on a side of the module that is not visible in FIG. 4. There are a total of eight ports on this prototype MDHX.

An experiment was set up using the prototype MDHX shown in FIG. 4. In the experiment, the prototype MDHX was operated as a normal membrane distillation module, without the use of the heat exchange section and heat exchange ports. The same conditions were then used running the prototype MDHX with the heat exchange section operating. The flow rate fed to the MD feed and permeate sides were varied for both a normal MD and the MDHX setup.

Figure 5:
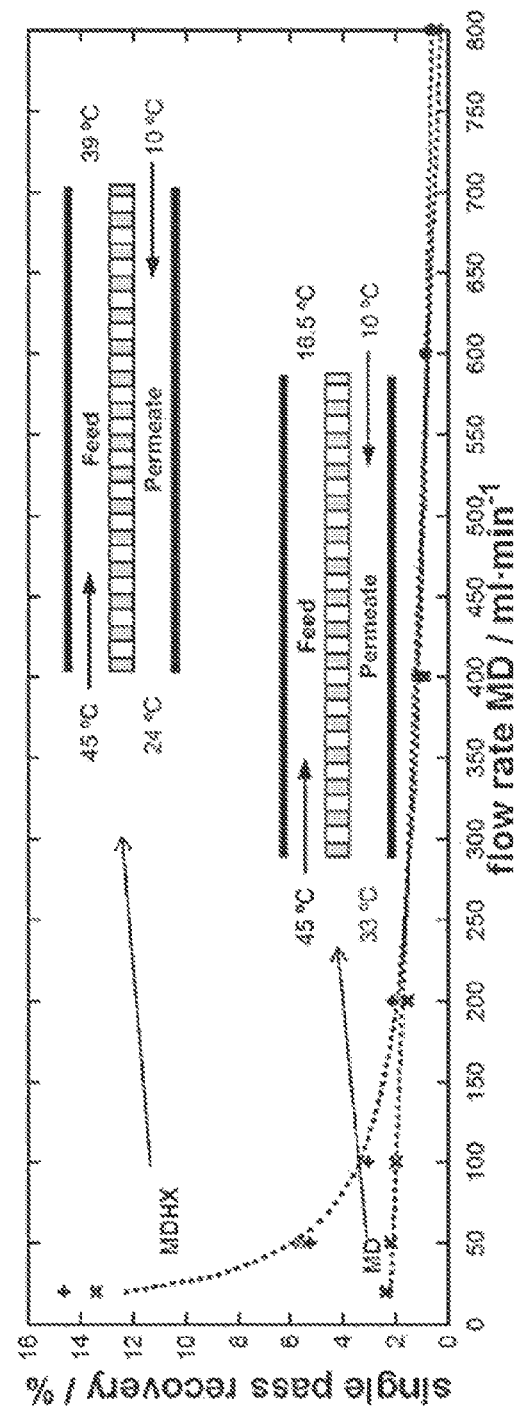
FIG. 5 provides experimental data from the prototype membrane distillation heat exchange system (MDHX) module shown in FIG. 4 compared to experimental data from a conventional Membrane Distillation system.

FIG. 5 provides experimental data from a prototype MDHX module compared to conventional Membrane Distillation system. Performance expressed as single pass recovery linked to MD channel flow rates.

The effect to the flux, expressed in terms of single pass recovery (or the ratio of the permeate flow over the feed flow) is shown in FIG. 5. HX channel conditions were kept at 55° C. on the hot side (Hot$_{in}$ and Hot$_{out}$), 5° C. into the cold side (Cold$_{in}$ and Cold$_{out}$) and flow was kept at 800 ml/min (0.13 m/s linear velocity). Here, for this prototype MDHX, flow rates higher than 200 mL/min yield similar performance to the MD-only system, but as the flow rate decreases, there is a great increase in the single pass recovery (at least 7-fold measured experimentally) because lost temperature in the MD hot channel is topped up by the HX hot channel. Likewise, the heat is removed from the MD permeate side by the HX cold channel ensuring effective temperature drop (i.e. driving force) across the membrane at low feed flows. The advantage of increased single pass recovery translates to lower recirculation to achieve full recovery (i.e. reduced multiple passes) which leads to less pumping requirement, thus less electricity for the same amount of treated water.

FIG. 5 also shows that the temperature conditions in the channels labelled on the MD channel insert diagrams. Under normal MD mode, the 45° C. Feed$_{in}$ stream drops to 39° C. (Feed$_{out}$). This drop is due to sensible heat transfer from conduction as well as latent heat transfer from membrane flux. This heat is transferred to the MD permeate stream causing it to rise to 33° C. from 10° C. There is an improvement by the MDHX system in the same temperature profiles where the MD feed stream now only drops to 39° C., and likewise the MD permeate stream rises only to 24° C. This is because of the HX hot and cold sides adding and removing heat from the MD feed and permeate sides respectively. Thus, for the same flow rate, there is a greater driving force across the membrane, leading to higher flux and thus higher single pass recovery.

Example 3

Reduction in Electrical Energy Required

Figure 6:
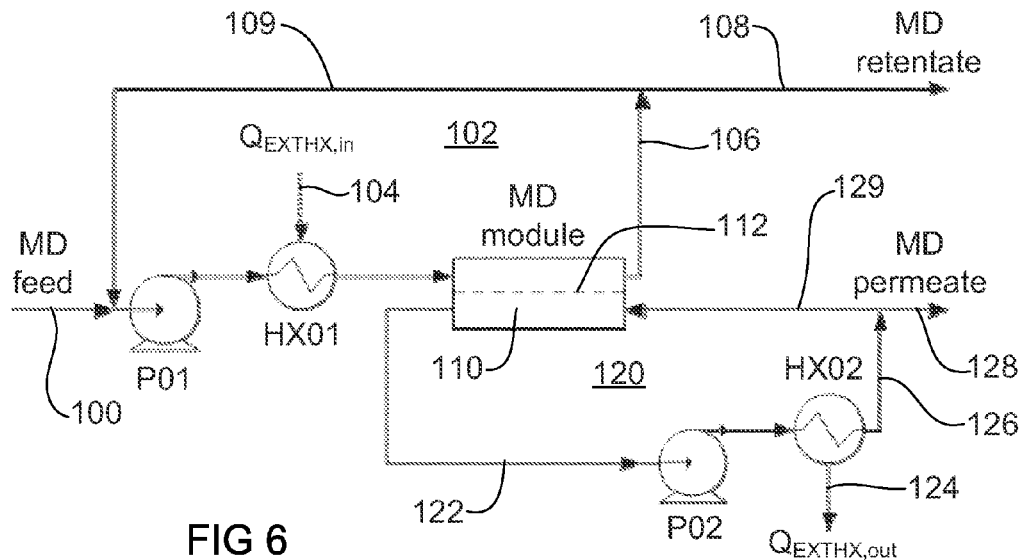
FIG. 6 shows a conventional (prior art) MD system in direct contact mode.
Figure 7:
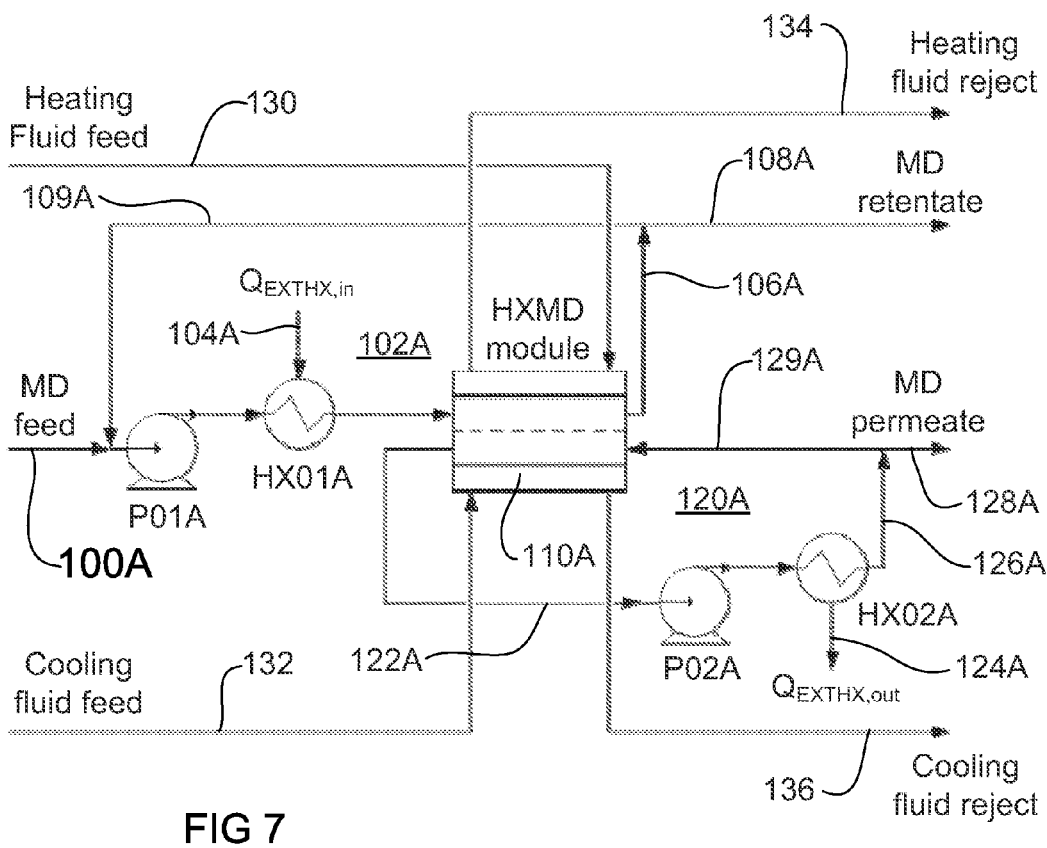
FIG. 7 shows the general configuration of a membrane distillation heat exchange system according to one embodiment of the present invention in a process configuration to reduce pump electricity requirements

A conventional membrane distillation (MD) system shown in FIG. 6 was operated as a comparison to a membrane distillation heat exchange (HXMD) system according to the present invention shown in FIG. 7.

In operating the MD system shown in FIG. 6, raw solution to be treated by MD enters at 'MD feed' 100, then enters a warm recirculation loop 102 pumped by pump 'P01'. The solution in the cycle 102 is heated by heat exchanger 'HX01' where heat energy is added via $Q_{EXTHX,in}$ 104, in this case an external heat source, such as a heating coil. The solution then passes into the MD module 110 where some treated permeate is removed from the cycle 102 via the membrane 112 in a single pass after which it then exits the module 110. A portion of retentate is drawn from module exit stream 106 into a reject stream 108, while the remaining majority returns to the entrance of P01 via recycle stream 109. The permeate that was treated via the membrane is now in the cooler permeate loop 120 where it is drawn by pump P02 through exit stream 122, then flows to the heat exchanger HX02 which cools the loop according to heat removed $Q_{EXTHX,out}$ 124. A portion of clean permeate is removed from stream 126, in discharge stream 128 which becomes product water, while the rest is returned to the module 110 via feed stream 129 to continue the permeate loop 120.

It is typically found that due to thermodynamic restrictions, a single pass in a normal MD module can take no more than ~2% of the flow entering the module (FIG. 6). This is highly unfavourable for a typical desalination process which aims to recover 50% to 90% (and more) of the water feed to the system. In order to achieve this via MD, the water must be recirculated by more than 30 times to achieve a practical recovery of feed water. This leads to sufficiently large pumps P01 and P02 which consume electricity thus defeating the potential for MD as a low-energy process.

The Applicant has found that a HXMD module according to the present invention can be set up to reduce pumping requirements, as shown in FIG. 7.

This setup has the same general configuration as the MD system in FIG. 6 with the inclusion of non-fluid connected heating feed source 130 and cooling feed source 132 connected directly to the HXMD module 110A. It should be noted that similar features in FIG. 7 to the MD module in FIG. 6 have been given the same reference numeral plus an "A" reference. The inclusion of non-fluid connected heating feed source 130 and cooling feed source 132 transfers the heating duty from HX01A and HX02A to the external heating/cooling fluids. It is feasible that HX01A and HX02A be removed completely.

Using the experimental data from FIG. 5 where 14% single pass recovery was achieved, the results in Table 1 demonstrate that an 86% reduction in the electricity required for pumps P01A and P02A for the HXMD system shown in FIG. 7 can be achieved in comparison to a conventional MD system shown in FIG. 6. The key assumption in this example is the use of an identical flux for both MD and HXMD to ensure the same overall process is compared. It was assumed that the pump works against the heat exchangers and module channels to a pressure drop of 20 kPa, which is typical in the Applicant's experience with MD modules. It was assumed both pumps circulate at the same rate.

TABLE 1 input parameters and performance results of MD and HXMD systems

| Parameter | Units | MD | HXMD |
|---|---|---|---|
| Flux | mL/min | 2.8 | 2.8 |
| Feed flow | mL/min | 140 | 20 |
| Pump pressure | kPa | 20 | 20 |
| Pump efficiency | % | 80 | 80 |
| Pump shaft power | mW | 56 | 8.1 |
| Total pump electricity | mW | 113 | 16 |
| Specific electric requirement | kWh/m$^3$ | 0.67 | 0.096 |
| Electricity reduction | % | — | 86 |

We see in Table 1, that the specific electric requirement of MD is lower (0.67 kWh/m$^3$), but still relatively high compared to state of the art desalination plants which use around 3 kWh of electricity for every cubic meter of fresh water produced (i.e. 3 kWh/m$^3$). HXMD improves the conventional MD specific electric requirement to <0.1 kWh/m$^3$. This example alone demonstrates a viable means for HXMD to harness waste heat, for example from waste industry sources or in conventional process heat exchange, to produce a treated process water with minimal electricity requirement. A reduced electric requirement means, for example, less greenhouse gas emissions associated with the electricity production.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A heat exchanger in which a quantity of heat energy is transferred from a hot process stream to a cold process stream to heat the cold process stream, the heat exchanger including:
   a hot process stream fluidly connected to an industrial process;
   a cold process stream fluidly connected to an industrial process; and
   a membrane distillation system including:
      a vapourising stream comprising a mixture of components;
      a condensing stream;
      a membrane located between the vapourising stream and the condensing stream, the vapourising stream and condensing stream being in fluid communication through the membrane, the membrane facilitating transfer of at least one volatised component of the vapourising stream into the condensing stream;
      a first heat transfer area between the hot process stream and the vapourising stream which, in use, facilitates the transfer of a quantity of heat energy from the hot process stream to the vapourising stream to heat the vapourising stream, the first heat transfer area being generally proximate the membrane such that in use, heat is transferred between the hot process stream and the vapourising stream when the vapourising stream contacts the membrane; and
      a second heat transfer area between the condensing stream and the cold process stream which, in use, facilitates transfer of a quantity of heat energy from the condensing stream to the cold process stream, the second heat transfer area being generally proximate the membrane such that in use, heat is transferred between the condensing stream and the cold process stream when the condensing stream contacts the membrane,
   wherein the first and second heat transfer areas are proximate and parallel to the membrane co-locating each of these heat transfer areas with the membrane in the heat exchanger, and
   wherein the hot process stream and cold process stream are fluidly separate to the vapourising stream and the condensing stream.

2. A heat exchanger according to claim 1, wherein said quantity of heat energy is transferred through the first heat transfer area, the membrane and the second heat transfer area.

3. A heat exchanger according to claim 1, further including a heat recovery system which facilitates transfer of a quantity of heat energy from the cold process stream heated by a quantity of heat energy from the condensing stream to the vapourising stream.

4. A heat exchanger according to claim 1, wherein at least one of the first heat transfer area or second heat transfer area comprises a heat exchanger.

5. A heat exchanger according to claim 1, wherein the membrane is a nonwetting microporous membrane.

6. A heat exchanger according to claim 1, wherein the hot process stream and cold process stream are process streams which are respectively cooled and heated in a co-located or generally proximate process.

7. A heat exchanger according to claim 1, wherein the vapourising stream comprises a water stream.

8. A membrane distillation apparatus including:
a vapourising stream comprising a mixture of components;
a condensing stream;
a membrane located between the vapourising stream and the condensing stream, the vapourising stream and condensing stream being in fluid communication through the membrane, the membrane facilitating transfer of at least one volatised component of the vapourising stream into the condensing stream;
a hot process stream;
a first heat transfer area between the hot process stream and the vapourising stream which in use facilitates the transfer of a quantity of heat energy from the hot process stream to the vapourising stream to heat the vapourising stream, the first heat transfer area being generally proximate the membrane such that in use, heat is transferred between the hot process stream and the vapourising stream when the vapourising stream contacts the membrane;
a cold process stream; and
a second heat transfer area between the condensing stream and the cold process stream which in use, facilitates transfer of a quantity of heat energy from the condensing stream to the cold process stream to produce a heated cold process stream the second heat transfer area being generally proximate the membrane such that in use, heat is transferred between the condensing stream and the cold process stream when the condensing stream contacts the membrane,
wherein the hot process stream and cold process stream are fluidly separate to the vapourising stream and the condensing stream, and
wherein the first and second heat transfer areas are proximate and parallel to the membrane co-locating each of these heat transfer areas with the membrane in the membrane distillation apparatus.

9. A membrane distillation apparatus according to claim 8, wherein in use, a quantity of heat energy is transferred from the hot process stream to the cold process stream to heat the cold process stream.

10. A membrane distillation apparatus according to claim 9, wherein said quantity of heat energy is transferred through the first heat transfer area, the membrane and the second heat transfer area.

11. A membrane distillation apparatus according to claim 8, further including a heat recovery system which facilitates transfer of a quantity of heat energy from the heated cold process stream to the vapourising stream.

12. A membrane distillation apparatus according to claim 8, wherein at least one of the first heat transfer area or second heat transfer area comprises a heat exchanger.

13. A membrane distillation apparatus according to claim 8, wherein the membrane is a nonwetting microporous membrane.

14. A membrane distillation apparatus according to claim 8, wherein the hot process stream and cold process stream are process streams which are respectively cooled and heated in a co-located or generally proximate process.

15. A membrane distillation apparatus according to claim 8, wherein the hot process stream is a waste heat source in a co-located or generally proximate process.

16. A membrane distillation apparatus according to claim 8, wherein the vapourising stream comprises a water stream.

* * * * *